United States Patent [19]
Yoshida et al.

[11] Patent Number: 5,178,933
[45] Date of Patent: Jan. 12, 1993

[54] COLORED GLASS LAMINATE AND THE IMPROVEMENT INCLUDING MIXING A MONOMER WITH A PIGMENT

[75] Inventors: Akio Yoshida, Omiya; Satoshi Minami, Tokyo; Tohoru Hosoda, Koshigaya, all of Japan

[73] Assignee: Dainichiseika Color & Chemicals Mfg. Co., Ltd., Tokyo, Japan

[21] Appl. No.: 612,964

[22] Filed: Nov. 15, 1990

[51] Int. Cl.$^5$ .............................................. B32B 3/00
[52] U.S. Cl. ................................. 428/207; 428/210; 428/426; 428/441; 156/109
[58] Field of Search ............. 428/402, 403, 407, 207, 428/206, 210, 426, 441, 327, 328; 156/109

[56] References Cited
U.S. PATENT DOCUMENTS

| | | | |
|---|---|---|---|
| 4,511,627 | 4/1985 | Tanuma et al. | 428/429 |
| 4,600,627 | 7/1986 | Honda et al. | 428/203 |
| 4,756,938 | 7/1988 | Hickman | 428/38 |
| 4,927,675 | 5/1990 | Adams et al. | 428/206 |

Primary Examiner—P. C. Sluby
Assistant Examiner—Hoa T. Le
Attorney, Agent, or Firm—Oblon, Spivak, McClelland, Maier & Neustadt

[57] ABSTRACT

A colored glass laminate is formed of two glass plates and a pigment-colored (meth)acrylic resin sandwiched between the glass plates. The colored glass laminate is produced by arranging a spacer between the two glass plates, pouring a mixture of at least one (meth)acrylic monomer, a polymerization initiator and a pigment into a spacing defined between the two glass plates, and then polymerizing the (meth)acrylic monomer.

3 Claims, No Drawings

COLORED GLASS LAMINATE AND THE IMPROVEMENT INCLUDING MIXING A MONOMER WITH A PIGMENT

BACKGROUND OF THE INVENTION

1) Field of the Invention

The present invention relates to a colored laminated glass, namely, a colored glass laminate and a production process thereof. More specifically, the present invention is concerned with a colored glass laminate excellent in light resistance and the like and its production process.

2) Description of the Related Art

Colored glass laminates have been increasingly finding utility as window glass for various buildings, automobiles, etc.

These colored glass laminates are produced by sandwiching a colored polyvinyl butyral film between two glass plates. This production process is however accompanied by the problem of being unable to provide colored glass laminate of large dimensions.

Another production process has recently been introduced, in which a colored glass laminate of large dimensions is produced by arranging a spacer between two glass plates, pouring a monomer into the spacing defined by the spacer and then polymerizing the monomer. As a method for coloring glass in accordance with this process, a dye may be dissolved in the monomer. However, a dye is generally inferior in light resistance. Glass laminates produced by this process therefore have a color fastness problem when used as window glass for exterior walls of buildings.

Such a problem can be overcome by the use of a pigment as a colorant. A pigment is however insoluble in a liquid and therefore undergoes settling in a monomer liquid, inducing such problems as reduced coloring power and irregular color density.

Such a dispersibility problem of a pigment can generally be resolved by a surfactant. In the case of coloring of a monomer liquid for a glass laminate, the concentration of the pigment is very low, usually, 1.0% or less, leading to the problem that no sufficient dispersion stability can be achieved by a conventional surfactant. For these reasons, no pigment-colored glass laminates have yet been known to date.

SUMMARY OF THE INVENTION

An object of the present invention is therefore to provide a colored glass laminate having excellent light resistance without pigment settling, namely, without irregularity in color density.

Another object of the present invention is to provide a process for producing such a colored glass laminate.

In one aspect of the present invention, there is thus provided a colored glass laminate formed of two glass plates and a (meth)acrylic resin sandwiched therebetween. The (meth)acrylic resin is colored with a pigment.

In another aspect of the present invention, there is also provided a process for producing a colored glass laminate by arranging a spacer between two glass plates, pouring a mixture of at least one (meth)acrylic monomer and a polymerization initiator into a spacing defined between said two glass plates and then polymerizing said at least one (meth)acrylic monomer. The mixture contains a pigment.

By coloring with a pigment a (meth)acrylic resin sandwiched between two glass plates, a colored glass laminate excellent in light resistance can be provided.

Upon production of the glass laminate, the pigment can be dispersed in a relatively small amount of a (meth)acrylic monomer to prepare a treated pigment in which the first-mentioned pigment is dispersed at a high concentration in the (meth)acrylic monomer. When a (meth)acrylic monomer or a mixture of at least one (meth)acrylic monomer and a polymerization initiator is colored with the treated pigment, the treated pigment can be stably dispersed in the (meth)acrylic monomer or the mixture. Even at an extremely low pigment concentration, a highly-colored glass laminate can therefore be provided without irregular color density.

The colored glass laminate according to the present invention has high sound-insulating capability and is also effective for shielding radiation such as infrared rays or ultraviolet rays. It can therefore be provided as function glass. Further, the colored glass laminate can be provided either as a transparent glass laminate or as a translucent glass laminate.

DETAILED DESCRIPTION OF THE INVENTION AND PREFERRED EMBODIMENTS

Glass plates usable in the present invention are general glass which have conventionally been used as window glass in various buildings, interior door glass, partition glass, automobile window shields and glass, and the like. The present invention can be applied to any glass, and no particular limitation is imposed on the type of the glass plates.

In particular, colored glass laminates can be easily produced at a construction site or the like. The present invention has therefore brought about the advantage that glass as large as from several square meters to somewhat over ten square meters, which has heretofore been too large to use, can be employed.

Butyl rubber or thermoplastic rubber, which has elasticity, is generally useful for the spacer employed upon superposition of the two glass plates. The spacer is arranged on one of the two glass plates along the peripheral edges thereof, and the other glass plate is then superposed over the former glass plate with the spacer interposed therebetween. As a result, a spacing is formed between the two glass plates. The spacing formed in this manner is generally about 0.5–3 mm thick although the thickness varies depending on the application purpose of the resulting glass laminate. Accordingly, the spacer is generally in the form of a cord or string having a thickness sufficient to provide such a spacing.

As the (meth)acrylic monomer to be poured into the spacing, it is preferable to use an alkyl (meth)acrylate, in which the alkyl group contains relatively many carbon atoms, e.g., butyl (meth)acrylate or 2-ethylhexyl (meth)acrylate in combination with a (meth)acrylic monomer which forms a hard resin, rather than the single use of the last-mentioned (meth)acrylic monomer. To impart sufficient flexibility to the polymer to be obtained, it is also preferable to incorporate a conventional plasticizer such as dibutyl phthalate or tributyl acetylcitrate, for example, in a proportion such that the plasticizer may account for 1–30 wt.% of the resulting polymer.

The pigment to be employed in this invention may be any one of pigments known conventionally. Exemplary usable pigments include organic pigments such as azo pigments, phthalocyanine pigments, quinacridone pigments, dioxazine pigments and anthraquinone pigments; inorganic pigments such as titanium oxide, chrome yellow, cadmium red, cadmium yellow, iron oxides and chromium oxides; carbon black; etc. These pigments can preferably be used in an amount of 0.001–1.0 part by weight per 100 parts by weight of the (meth)acrylic monomer or, where two or more (meth)acrylic monomers are used in combination, per 100 parts by weight of the sum of the (meth)acrylic monomers.

The pigment can be added in any suitable manner as long as the pigment can be stably dispersed as fine particles in the (meth)acrylic monomer or in the mixture of the (meth)acrylic monomer and the polymerization initiator. It is however preferable to highly disperse the pigment at a relatively high concentration in a (meth)acrylic monomer, which is either the same as or different from the first-mentioned (meth)acrylic monomer, or a polymer thereof and to use the pigment as a treated high-concentration pigment whose surfaces have been rendered fully compatible with the (meth)acrylic monomer to which the pigment is added. For example, as will be described subsequently in examples of the present invention, upon preparation of a monomer mixture to be poured into a spacing between two glass plates, a portion of the monomer is taken out. To 100 parts by weight of the monomer mixture, 1–50 parts by weight of a pigment is added, followed by thorough kneading to disperse the pigment in the monomer mixture. The pigment thus treated is then diluted to a suitable concentration with a monomer of the same type as that employed to prepare the monomer mixture. In this manner, the pigment can be stably dispersed with extreme ease at an extremely low concentration in the monomer mixture to be poured into the spacing between the two glass plates.

The process of the present invention for the production of a colored glass laminate, in which materials such as those described above are used, can itself be carried out in a manner known per se in the art. For example, two glass plates of desired size and thickness are provided. One of the glass plates is placed in a horizontal position on a floor or work table. A spacer is then arranged on the glass plate along the peripheral edges thereof. The other glass plate is then superposed on the first-mentioned glass plate with the spacer interposed therebetween. The two glass plates are then fixed relative to each other by a suitable method. Needless to say, the spacer defines at a portion thereof a cut-out as a pouring port which permits therethrough pouring of a mixture composed of one or more (meth)acrylic monomers and a suitable polymerization initiator and containing a pigment dispersed therein. The two glass plate thus superposed are then brought into an upright position with the pouring port located in an uppermost position, and the monomer mixture is poured into the spacing through the pouring port. Since the pouring port is situated at the highest position, the internal air can be entirely replaced by the monomer mixture upon completion of the pouring, so that no bubbles are allowed to remain in the monomer mixture thus poured. By leaving over the superposed two glass plates in a horizontal position subsequent to the completion of the pouring, the internal pressure is equalized and while the uniform thickness is maintained, polymerization is brought to completion in several hours. As a result, an evenly-colored glass laminate of the present invention, free of irregularity in color density, can be obtained.

The present invention will next be described more specifically by the following examples and comparative example, in which all designations of "part" or "parts" and "%" are on a weight basis unless otherwise specifically indicated.

EXAMPLE 1

After one part of copper phthalocyanine blue and 3 parts of dibutyl phthalate were mixed, they were subjected to dispersion in a motor mill (manufactured by Eiger Corp.). To one part of the dispersion thus formed, were gradually added under vigorous stirring 10 parts of a monomer mixture which consisted of 20 parts of methyl methacrylate, 25 parts of butyl acrylate, 15 parts of 2-ethylhexyl acrylate, 15 parts of 2-ethylhexyl methacrylate and 25 parts of dibutyl phthalate. They were stirred into an intimate mixture and then filtered through a cartridge filter, whereby coarse particles were removed and a colorant of a blue color was obtained.

One part of the colorant was diluted in 100 parts of the monomer mixture, to which a radical polymerization initiator was added to obtain a colored monomer mixture.

On the other hand, two glass plates of 30 cm×20 cm wide and 3.0 mm thick were superposed one over the other with a 1-mm thick butyl rubber spacer interposed therebetween, and were fixed to each other along their peripheral edges. The colored monomer mixture prepared above was then poured through a pouring port of the spacer into the spacing formed between the two glass plates. After the pouring port was closed, the glass plates were left over in a horizontal position for 5 hours at 18° C. or higher. The monomer mixture was hence polymerized so that a colored glass laminate of the present invention was obtained.

The colored glass laminate had a light blue color and sufficient transparency. No irregularity in color density was observed at all. It was subjected to an accelerated light resistance test. There was observed no fading whatsoever even after a time equivalent to 10,000 hours.

EXAMPLE 2

One part of carbon black and 3 parts of a cellulose acetate butyrate resin were heated, melted and kneaded into a black master batch through a mixing roll.

One part of the master batch was dissolved under vigorous stirring in 10 parts of a monomer mixture which consisted of 25 parts of methyl methacrylate, 20 parts of butyl acrylate, 25 parts of 2-ethylhexyl acrylate, 15 parts of 2-hydroxyethyl methacrylate and 15 parts of tributyl acetylcitrate. The resultant liquid was filtered through a cartridge filter, whereby coarse particles were removed and a colorant of a black color was obtained.

One part of the colorant was diluted in 100 parts of the monomer mixture, to which a radical polymerization initiator was added to obtain a colored monomer mixture.

On the other hand, two glass plates of 2,200 cm×1,800 cm wide and 6.8 mm thick were fixed relative to each other along their peripheral edges with a 1-mm thick butyl rubber spacer interposed therebetween. The colored monomer mixture prepared above was then poured through a pouring port of the spacer into the spacing formed between the two glass plates. After the pouring port was closed, the glass plates were left over in a horizontal position for 5 hours at 18° C. or higher. The monomer mixture was hence polymerized so that a colored glass laminate of the present invention was obtained.

The colored glass laminate had a light bronze color and sufficient transparency. No irregularity in color density was observed at all. It was subjected to an accelerated light resistance test. There was observed no fading whatsoever even after a time equivalent to 10,000 hours.

EXAMPLE 3

Using 7 parts of titanium oxide ("R-820", trade name; product of Ishihara Sangyo Kaisha, Ltd.) 2 parts of nitrocellulose "RS1/2" (trade name; product of Daicel Chemical Industries, Ltd.) and 10 parts of dibutyl phthalate, a master batch was obtained in a similar manner to Example 2. Thereafter, the procedures of Example 2 were repeated so that a colored glass laminate of a milky white color was obtained. This colored glass laminate is useful for an application field in which translucency is required or desired.

COMPARATIVE EXAMPLE 1

A colored glass laminate was obtained in a similar manner to Example 1 except that a blue dye (C.I. Solvent 25) was dissolved at a concentration of 0.01% in an uncolored monomer mixture. The colored glass laminate was completely faded under the test conditions of Example 1.

We claim:

1. In a colored glass laminate formed of two glass plates and an acrylic resin sandwiched therebetween, the improvement wherein said acrylic resin is colored with a pigment, wherein the concentration of said pigment in said acrylic resin ranges from 0.001 part by weight to 1.0 part by weight per 100 parts by weight of the sum of one or more acrylic monomers used to form said acrylic resin.

2. In a process for producing a colored glass laminate by arranging a spacer between two glass plates, pouring a mixture of at least one (meth)acrylic monomer and a polymerization initiator into a spacing defined between said two glass plates and then polymerizing said at least one (meth)acrylic monomer, the improvement wherein said mixture contains a pigment, wherein the concentration of said pigment in said acrylic resin ranges from 0.001 part by weight to 1.0 part by weight per 100 parts by weight of the sum of one or more acrylic monomers used to form said acrylic resin.

3. The process of claim 2, wherein said pigment is a pre-treated pigment obtained by dispersing 1-50 parts by weight of a pigment in 100 parts by weight of a (meth)acrylic monomer.

* * * * *